United States Patent
Caceres et al.

(10) Patent No.: US 9,832,025 B2
(45) Date of Patent: Nov. 28, 2017

(54) REMOTE SECURE ELEMENT POLICY MANAGEMENT

(71) Applicant: Verizon Patent and Licensing Inc., Basking Ridge, NJ (US)

(72) Inventors: Manuel Enrique Caceres, Basking Ridge, NJ (US); Warren Hojilla Uy, Randolph, NJ (US); Ruben Cuadrat, New York, NY (US); Taussif Khan, Monroe, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 14/715,702

(22) Filed: May 19, 2015

(65) Prior Publication Data
US 2016/0344560 A1    Nov. 24, 2016

(51) Int. Cl.
*G06F 7/04* (2006.01)
*H04L 9/32* (2006.01)
*H04W 12/04* (2009.01)
*H04L 29/06* (2006.01)

(52) U.S. Cl.
CPC .......... *H04L 9/3268* (2013.01); *H04L 9/3265* (2013.01); *H04W 12/04* (2013.01); *H04L 63/0807* (2013.01); *H04L 63/0823* (2013.01)

(58) Field of Classification Search
CPC .......................... H04L 9/3268; H04L 63/0807
USPC ........................................................ 726/2–10
See application file for complete search history.

(56) References Cited

U.S. PATENT DOCUMENTS

| | | | | |
|---|---|---|---|---|
| 7,644,278 B2* | 1/2010 | Catherman | ............. | G06F 21/57 380/286 |
| 7,694,142 B2* | 4/2010 | Saw | ....................... | G06F 21/608 705/51 |
| 2009/0061934 A1* | 3/2009 | Hauck | ................... | H04W 8/265 455/558 |
| 2011/0280406 A1* | 11/2011 | Ma | ........................... | H04B 5/02 380/278 |
| 2014/0066015 A1* | 3/2014 | Aissi | ..................... | H04W 12/06 455/411 |

(Continued)

OTHER PUBLICATIONS

Hubbard et al., "A study of SSL Proxy attacks on Android and iOS mobile applications," 2014 IEEE 11th Consumer Communications and Networking Conference (CCNC) Year: 2014 pp. 86-91.*

(Continued)

*Primary Examiner* — Roderick Tolentino

(57) ABSTRACT

A policy server that is associated with a secure element owner receives a request, from a service provider, to provision access, by an application, to the secure element. The policy server creates, in response to the request, a policy ticket, for the service provider, that defines privileges for the service provider to create a security domain or a new profile within the secure element. The policy server provides, to a service provider trusted service manager (TSM), the policy ticket and a signed certificate, the signed certificate corresponding to a root certificate that is inserted into a Controlling Authority Security Domain (CASD) portion of the secure element prior to receiving the request. When the CASD receives the policy ticket and signed certificate from the service provider TSM, the CASD validates based on the root certificate and provisions access to the secure element based on information in the policy ticket.

17 Claims, 7 Drawing Sheets

(56) References Cited

U.S. PATENT DOCUMENTS

| | | | | |
|---|---|---|---|---|
| 2014/0140507 A1* | 5/2014 | Park | ............... | H04W 8/245 |
| | | | | 380/247 |
| 2014/0164475 A1* | 6/2014 | Gargiulo | ............... | H04L 9/32 |
| | | | | 709/202 |
| 2014/0250501 A1* | 9/2014 | Berard | ............... | G06F 21/62 |
| | | | | 726/4 |
| 2014/0359295 A1* | 12/2014 | Saif | ............... | H04W 12/04 |
| | | | | 713/173 |
| 2015/0213433 A1* | 7/2015 | Khan | ............... | G06Q 20/3227 |
| | | | | 705/71 |

OTHER PUBLICATIONS

Baia et al. "Android as a Cloud Ticket Validator," 2013 International Conference on Cloud & Ubiquitous Computing & Emerging Technologies Year: 2013 pp. 1-7.*

* cited by examiner

| SERVICE PROVIDER IDENTIFIER |
| 510 |
| SD IDENTIFIER |
| 520 |
| DESCRIPTION |
| 530 |
| SD POLICIES |
| 540 |

US 9,832,025 B2

REMOTE SECURE ELEMENT POLICY MANAGEMENT

BACKGROUND

The use of devices to make secure and convenient transactions is expected to grow and present new opportunities to users and providers of services and applications. Providing trusted channels for transactions relies upon collaboration between a variety of parties, including Mobile Network Operators (MNOs), financial institutions, service providers, and end users. Because the number of parties in the mobile transaction ecosystem can be large, a secure network entity called a Trusted Service Manager (TSM) can facilitate interactions between the various parties, and specifically act as a trusted element for provisioning and personalization of information on a secure memory. For example, a TSM can remotely initialize a secure memory, such as a so-called Secure Element (SE), which is one type of a protected integrated storage and execution platform installed within the device, so the user may, for example, safely transact with the appropriate parties for goods and services. This initialization can include provisioning the SE with secure applications and/or cryptographic data.

Remote management is a critical operation in the deployment of services in SEs and, more importantly, for multi-partner scenarios. However, these operations are very expensive in terms of cost and user experience.

BRIEF DESCRIPTION OF THE DRAWINGS

FIG. 5 is a simplified diagram of fields in policy ticket; and

DETAILED DESCRIPTION OF PREFERRED EMBODIMENTS

The following detailed description refers to the accompanying drawings. The same reference numbers in different drawings may identify the same or similar elements.

Systems and methods described herein minimize the need for over-the-air (OTA) operations to reduce the amount of time users of devices wait for service and reduce the cost (e.g., in terms of bandwidth use and other resources) of OTA campaigns. The systems and methods simplify remote management operations between two parties, whereby a first partner grants privileges to a second partner, and the second partner can, later on, remotely access secure elements on the devices. Implementations described herein use public key infrastructure (PKI) and a third party to establish a confidential establishment of OTA keys necessary for creating security domains (SDs). In a multi-partner project, the implementations described herein can be used for the establishment of OTA keys necessary for profile downloads.

As used herein, the term "security domain" may include a secure memory space within a secure element. The term "profile" may include combination of a file structure, data and applications to be provisioned onto a security domain. Also, as used herein, the term "profile container" may include a logical container, for a profile, that enables separation from other profiles and enables secure communications.

Figure 1:
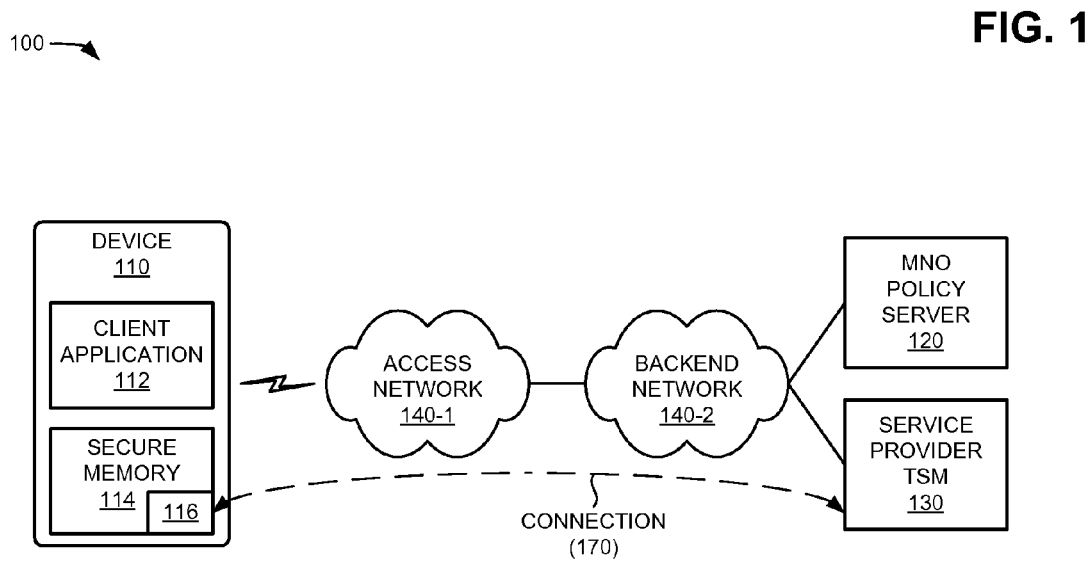
FIG. 1 is a block diagram of an exemplary environment for establishing remote secure element policy management without a dedicated over-the-air (OTA) session.

FIG. 1 is a block diagram showing an exemplary network environment 100 for establishing remote secure element policy management without a dedicated OTA session. The environment may include a device 110, a mobile network operator (MNO) policy server 120, a service provider trusted service manager (TSM) 130. Device 110, MNO policy server 120, and service provider TSM 130 may be interconnected by a number of networks 140 to provide communications over a variety of different connections, which include secure connections for facilitating trusted exchanges. For ease of explanation, only one device 110, MNO policy server 120, and service provider TSM 130 are illustrated as being connected to networks 140. However, it should be understood that a number of devices 110, MNO policy servers 120, service provider TSMs 130, and/or other known network entities may be communicatively coupled to networks 140.

Networks 140 may include a plurality of networks of any type, and may be broadly grouped into one or more access networks 140-1 and one or more backend networks 140-2. Access network 140-1 provides connectivity between device 110 and other network elements within access network 140-1 and/or backend network 140-2. Access network 140-1 may include, for example, a telecommunications network (e.g., a Public Switched Telephone Network (PSTN)), wired (e.g., Ethernet) and/or wireless local area network(s) (LAN) (e.g., Wi-Fi), wireless wide area networks (WAN) (e.g., WiMax), and/or one or more cellular (or mobile) networks. The cellular network may include a Code Division Multiple Access (CDMA) 2000 network, a Global System for Mobile Communications (GSM) network, a Long Term Evolution (LTE) network and/or other types of networks not specifically described herein. Backend network 140-2 may exchange data with access network 140-1 to provide device 110 connectivity to various servers, gateways, and other network entities, which may include one or more service provider TSMs 130. Backend network 140-2 may include a wide area network (WAN), a metropolitan area network (MAN), an intranet, the Internet, a wireless satellite network, a cable network (e.g., an optical cable network).

Device 110 may include any type of electronic device having communication capabilities, and thus communicate over networks 140 using a variety of different channels, including both wired and wireless connections. Device 110 may include, for example, a cellular radiotelephone, a smart phone, a tablet, a set-top box (STB), a mobile phone, a Voice over Internet Protocol (VoIP) device, a laptop computer, a palmtop computer, a gaming device, a media player device, or a digital camera that includes communication capabilities (e.g., wireless communication mechanisms).

Device 110 may further include one or more client applications 112 and a secure memory 114. Secure memory 114 can provides a trusted and compartmentalized storage and execution environment, and securely stores cryptographic data as well as programs from various service providers. In some implementations, secure memory 114 may include a secure element (SE) 116, a Trusted Execution Environment (TEE), or other devices capable of providing secure storage and/or program execution. In embodiments presented below, a SE 116 is shown; however other types of secure memory 114 may also be used.

Client application 112 may execute on the device 110, and provide a user interface for interacting with a particular service provider. For example, client application 112 may be a "wallet client" associated with credit cards and/or debit card applications. Client application 112 may access various resources provided by device 110. For example, client application 112 may communicate with other entities, both within device 110 and external network entities over one or more networks of networks 140. For example, client application 112 may communicate with and SE 116, which in this embodiment is an internal component residing in device 110.

SE 116 is a tamper resistant platform which may be embodied in a single chip secure microcontroller, such as a subscriber identity module (SIM) card. SE 116 is capable of securely storing applications (hereinafter referred to as "secure applications") and cryptographic data (such as, for example, secure keys). The secure information stored in SE 116 may be managed in accordance with rules and security requirements provided by established trusted authorities. SE 116 may communicate with service provider TSM 130 using access networks 140-1 over a secure SE-TSM connection 170 which supports bearer independent protocol (BIP) sessions. BIP sessions permit the SE and TSM to communicate independently of the physical transportation layers which support secure SE-TSM connections 170. BIP is a mechanism by which device 110 provides SE 116 access to the data bearers supported by the device, which include bearers associated with local area networks (e.g., Bluetooth®, IrDA, etc.) and/or wide area networks (e.g., GPRS, 3G, HSxPA, HSPA+, LTE, etc.). Specifically, BIP is designed to make use of any IP based connection that device 110 is capable of establishing. Once a BIP session is established, Global Platform (GP) commands/payloads may be securely exchanged between SE 116 and service provider TSM 130. It is noted that access network(s) 140-1 can be one type of network, or multiple networks using different protocols, air channels, etc. which may be used independently. For example, secure SE-TSM connection 170 may be established over a cellular (e.g., LTE) connection while client application 112 conducts communications over a Wi-Fi connection.

MNO policy server 120 may be a server device having functions that include codifying and storing rules regarding how the resources of SE 116 may be shared by service providers. MNO policy server 120 may be operated by the MNO (also referred to as "owner") of SE 116. MNO policy server 120 may generate tickets for service providers that enable restricted provisioning functions to be performed by service provider TSM 130. MNO policy server 120 may receive a request from a service provider to provision access, by an application, to secure element 116. In response, MNO policy server 120 may create a policy ticket for the particular service provider. The policy ticket may define privileges for the service provider to create/modify a security domain or a new profile within the secure element. MNO policy server 120 may provide, to service provider TSM 130, the policy ticket and a signed certificate. The signed certificate may correspond (e.g., use the same cryptographic keys) to root certificate that was inserted into SE 116 at the time of manufacture (or inserted at another point in time prior to receiving the request from the service provider).

Service provider TSM 130 may be a server device having functions which include accessing and managing SE 116 for provisioning operations, which can include operations of maintenance, personalization, instantiation, etc. Security is maintained since SE 116 only accepts new security domains, secure applications, and/or data from authorized service provider TSMs 130 (e.g., as indicated by certifications from MNO policy server 120). Service provider TSM 130 does not necessarily participate in actual transactions between client application 112 on device 110 and a service provider, as these transactions are processed by systems previously established by the service provider and its merchant partners. Instead, service provider TSM 130 may act as an entity that enables the service provider to provision SE 116 to receive secure applications remotely by allowing access to the secure storage and processing resources within SE 116.

In summary, the functions of service provider TSM 130 may include: issuing and managing a trusted execution environment in SE 116; assigning trusted areas within a trusted execution environment to a specific service; managing keys for a trusted execution environment; safely downloading secure applications into SE 116; personalizing applications; and locking, unlocking, and deleting secure applications according to the permissions granted by the MNO. While only one service provider TSM 130 is shown in FIG. 1, environment 100 may have a number of different service provider TSMs 130 operated by different service providers and granted different access privileges. For example, each service provider TSM may remotely manage security domains, provisioning, and lifecycles of the service provider's secure application and cryptographic key data within the scope of privileges granted from MNO policy server 120.

In contrast with the systems and methods described herein, conventional remote secure element policy management is a two-step process. First, the owner of the SIM card has to perform an OTA operation and prepare the card for the service provider (either by creating the security domain (SD) or, in the case of multi-partner, the creation of a profile container). Second, the service provider has to use OTA access to the SIM card to personalize the SD just created. In the first step, the owner of the card establishes all the policies applicable to the SD or profile (i.e. extradition rules, etc.).

According to implementations described herein, remote secure element policy management can be accomplished using asymmetric cryptography techniques (e.g., as defined in the Global Platform card specification), such that only one OTA transfer (e.g., between service provider TSM 130 and SE 116) is needed instead of the two required in conventional techniques. This single OTA management benefits the service providers, as they can setup the security domains on their own, as well as the card owner, which is freed from performing an OTA session to setup policies applicable to the SD or profile for the service provider.

Figure 2:
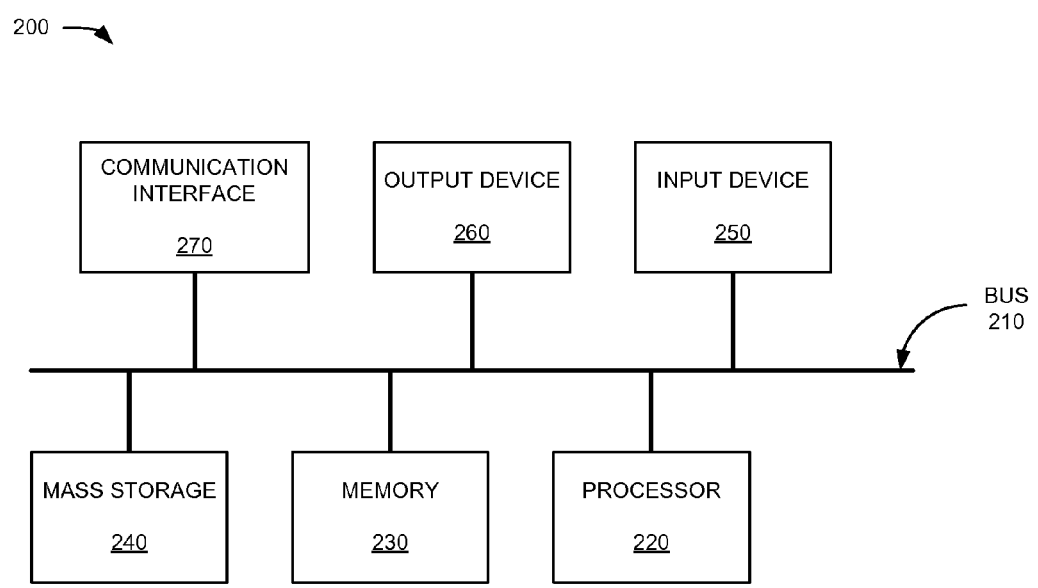
FIG. 2 is a block diagram depicting exemplary components of an application server according to an implementation.

FIG. 2 is a block diagram depicting exemplary components of a device 200 that may correspond to one of MNO policy server 120 or service provider TSM 130. Device 200 may include a bus 210, a processor 220, a memory 230, mass storage 240, an input device 250, an output device 260, and a communication interface 270.

Bus 210 includes a path that permits communication among the components of server 140. Processor 220 may include any type of single-core processor, multi-core processor, microprocessor, latch-based processor, and/or processing logic (or families of processors, microprocessors, and/or processing logics) that interprets and executes instructions. In other embodiments, processor 220 may include an application-specific integrated circuit (ASIC), a field-programmable gate array (FPGA), and/or another type of integrated circuit or processing logic. For example, the processor 220 may be an x86 based CPU, and may use any operating system, which may include varieties of the Windows, UNIX, and/or Linux. The processor 220 may also use high-level analysis software packages and/or custom software written in any programming and/or scripting languages for interacting with other network entities and providing applications to a plurality of devices 110 which are communicatively coupled to networks 140.

Memory 230 may include any type of dynamic storage device that may store information and/or instructions, for execution by processor 220, and/or any type of non-volatile storage device that may store information for use by processor 220. For example, memory 230 may include a RAM or another type of dynamic storage device, a ROM device or another type of static storage device, and/or a removable form of memory, such as a flash memory. Mass storage device 240 may include any type of on-board device suitable for storing large amounts of data, and may include one or more hard drives, solid state drives, and/or various types of RAID arrays. Mass storage device 240 would be suitable for storing files associated client applications for distribution to a plurality of devices 110.

Input device 250, which may be optional, can allow an operator to input information into device 200, if required. Input device 250 may include, for example, a keyboard, a mouse, a pen, a microphone, a remote control, an audio capture device, an image and/or video capture device, a touch-screen display, and/or another type of input device. In some embodiments, device 200 may be managed remotely and may not include input device 250. Output device 260 may output information to an operator of device 200. Output device 260 may include a display (such as an LCD), a printer, a speaker, and/or another type of output device. In some embodiments, device 200 may be managed remotely and may not include output device 260.

Communication interface 270 may include a transceiver that enables device 200 to communicate over networks 140 with other devices and/or systems. The communications interface 270 may be a wireless communications (e.g., RF, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 270 may include a transmitter that converts baseband signals to RF signals and/or a receiver that converts RF signals to baseband signals. Communication interface 270 may be coupled to one or more antennas for transmitting and receiving RF signals. Communication interface 270 may include a logical component that includes input and/or output ports, input and/or output systems, and/or other input and output components that facilitate the transmission/reception of data to/from other devices. For example, communication interface 270 may include a network interface card (e.g., Ethernet card) for wired communications and/or a wireless network interface (e.g., a Wi-Fi) card for wireless communications. Communication interface 270 may also include a USB port for communications over a cable, a Bluetooth® wireless interface, an RFID interface, an NFC wireless interface, and/or any other type of interface that converts data from one form to another form.

As described below, device 200 may perform certain operations relating to establishing remote secure element policy management. Device 200 may perform these operations in response to processor 220 executing software instructions contained in a computer-readable medium, such as memory 230 and/or mass storage 240. The software instructions may be read into memory 230 from another computer-readable medium or from another device. The software instructions contained in memory 230 may cause processor 220 to perform processes described herein. Alternatively, hardwired circuitry may be used in place of, or in combination with, software instructions to implement processes described herein. Thus, implementations described herein are not limited to any specific combination of hardware circuitry and software.

Although FIG. 2 shows exemplary components of device 200, in other implementations, device 200 may include fewer components, different components, additional components, or differently arranged components than depicted in FIG. 2.

Figure 3A:
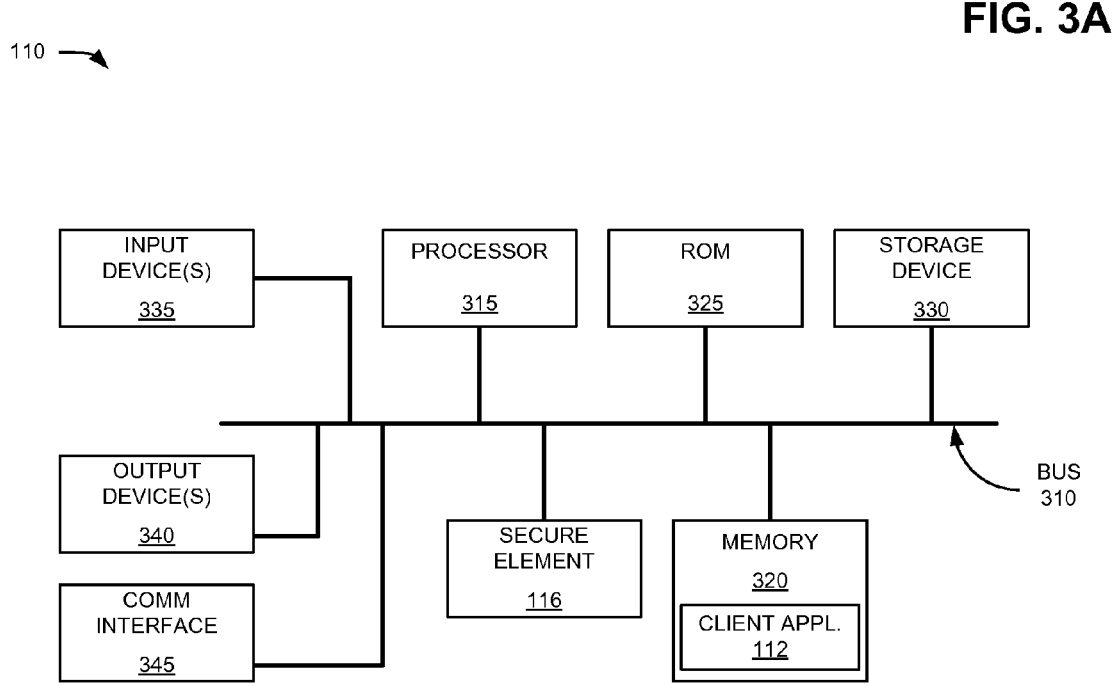
FIG. 3A is a block diagram showing exemplary components of a device according to an implementation.

FIG. 3A is a block diagram showing exemplary components of device 110 according to an embodiment. Device 110 may include a bus 310, a processor 315, memory 320, a read only memory (ROM) 325, a storage device 330, an input device(s) 335, an output device(s) 340, a communication interface 345, and SE 116. Bus 310 may include a path that permits communication among the elements of device 110. SE 116 may be inserted into a secure element interface (I/F) (e.g., a smart card or SIM card interface) of device 110.

Processor 315 may include a processor, microprocessor, or processing logic that may interpret and execute instructions. Memory 320 may include a random access memory (RAM) or another type of dynamic storage device that may store information and instructions for execution by processor 315. ROM 325 may include a ROM device or another type of static storage device that may store static information and instructions for use by processor 315. Storage device 330 may include a magnetic and/or optical recording medium and its corresponding drive.

Input device(s) 335 may include one or more mechanisms that permit an operator to input information to device 110, such as, for example, a keypad or a keyboard, a microphone, voice recognition and/or biometric mechanisms, etc. Output device(s) 340 may include one or more mechanisms that output information to the operator, including a display, a speaker, etc. Communication interface 345 may include any transceiver mechanism that enables device 110 to communicate with other devices and/or systems. For example, communication interface 345 may include mechanisms for communicating with another device or system via a network, such as networks 130.

SE 116 may be insertable into (or otherwise connected to) device 110 via a smart module interface, which may store secure applications and data to permit device 110 to perform trusted exchanges with other network entities. SE 116 may include, for example, a Universal Integrated Circuit Card (UICC), an embedded SE, or a microSD (Secure Digital) card.

Device 110 may perform certain operations or processes, as may be described in detail below. Device 110 may perform these operations in response to processor 315 executing software instructions contained in a computer-readable medium, such as memory 320. A computer-readable medium may be defined as a physical or logical memory device. A logical memory device may include memory space within a single physical memory device or spread across multiple physical memory devices. Memory 320 may further include memory space which stores client application 112. The software instructions may be read into memory 320 from another computer-readable medium, such as storage device 330, or from another device via communication interface 345. The software instructions contained in memory 320 may cause processor 315 to perform operations or processes that will be described in detail with respect to FIG. 4. Alternatively, hardwired circuitry may be used in place of or in combination with software instructions to implement processes consistent with the principles of the embodiments. Thus, exemplary implementations are not limited to any specific combination of hardware circuitry and software.

The configuration of components of device 110 illustrated in FIG. 3A is for illustrative purposes only. It should be understood that other configurations may be implemented. Therefore, device 110 may include additional, fewer and/or different components than those depicted in FIG. 3A.

Figure 3B:
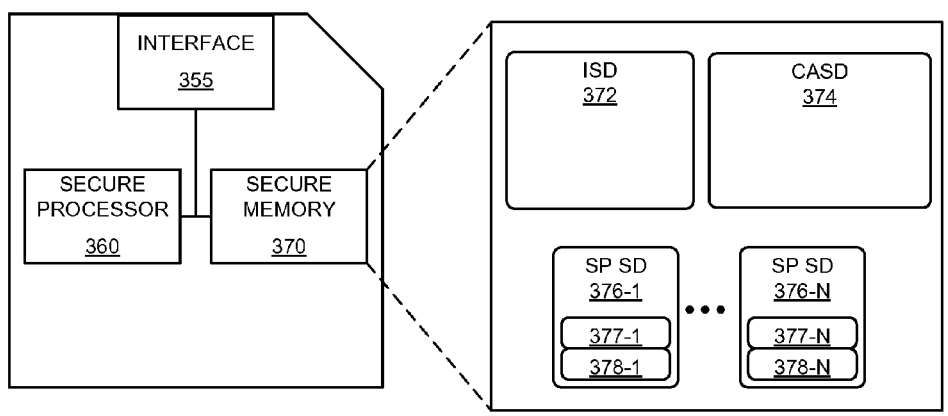
FIG. 3B is a block diagram showing exemplary components and a memory layout of a secure element according to an implementation.

FIG. 3B is a block diagram showing exemplary components of Secure Element (SE) 116 and an associated secure memory layout according to an embodiment. SE 116 is the component in device 110 providing the security and confidentiality required to support trusted exchanges among various network entitles over networks 140. In general, SE 116 is a tamper-resistant platform (e.g., a single-chip secure microcontroller) capable of securely hosting applications and their associated confidential and/or cryptographic data (e.g., key management) in accordance with the rules and security requirements set forth by a set of well-identified trusted authorities. Common implementations of SE 116 may include a UICC, embedded SE, and microSD, where the UICC and microSD may be removable. SE 116 may include an interface 355, a secure processor 360, and a secure memory 370.

Interface 355 may include circuitry for inputting data to SE 116 from device 110, and output circuitry for outputting data from SE 116 to device 110. Secure processor 360 may include a processor, microprocessor, or processing logic that may interpret and execute instructions stored in secure memory 370. For example, secure processor 360 may interpret and execute instructions received from service provider TSM 130. Memory 370 may include RAM, ROM, and/or Electrically Erasable Programmable Read-Only Memory (EEPROM).

Secure memory 370 may further be organized according to various security domains to ensure sensitive information remains compartmentalized, and cannot be shared between different service providers or the MNO. Specifically, according to Global Platform guidelines, a number of different security domains can be established such that each organization is associated with its own security domain. As shown in FIG. 3B, secure memory 370 may include an Issuer Security Domain (ISD) 372, a Controlling Authority Security Domain (CASD) 374, and multiple service provider security domains SP SD 376-1 through SP SD 376-n (generically and individually referred to herein as "SP SD 376"). The MNO may be associated with ISD 372. ISD 372 may store a framework companion which includes instructions for interfacing with an application framework which executes on processor 315 in mobile device 110. Additionally, ISD 372 may include a set of default keys set by the SE manufacturer (or owner).

CASD 374 may authenticate the certificate of the service provider and sign the public cryptographic key. The CASD may conform, for example, to requirements specified in the Global Platform Card Specification V2.2 (or later versions). The CASD may provide an interface that is independent of SP SDs 376, to provide services such as certificate authentication, signature, data decryption, etc. In one implementation, CASD may include one or more secure applications to enforce policy tickets received from service provider TSM 130.

Secure memory 370 may further include compartmentalized memory areas (i.e., each SP SD 376) which may be associated with each service provider for which device 110 transacts. Thus, each service provider is associated with a different security domain, SP SD1 376-1 through SP SD 376-n. Each security domain SP SD 376 has its own separate memory store for secure data 377-1 through 377-n (generically and individually referred to herein as "secure data 377") which may store sensitive information such as account numbers and/or cryptographic keys which are only known to the respective service provider. Additionally, each SP SD 376 may have its own separate memory store 378-1 through 378-n (generically and individually referred to herein as "memory store 378") for secure application(s) associated with each service provider.

The secure applications may run on secure processor 360, which is separate from processor 315 of mobile device 110 for security. Accordingly, each service provider may cipher/authenticate a payload with the cryptographic keys personalized for its security domain. Only applications on the security domain associated with the service provider are able to decipher its respective payload. Secure applications in memory store 378 may include, for example, credit card applications, debit card applications, loyalty program applications, ticketing applications, building access applications, and travel applications.

When SE 116 undergoes a provisioning/personalization process for a specific service provider, the SE 116 is loaded with the appropriate secure applications and sensitive data, such as account numbers and/or cryptographic keys, into the appropriate SP SDs 376. This provisioning may be provided over the air using an established secure SE-TSM connection 170 during a BIP session.

SE 116 may perform certain operations or processes, as may be described in detail below in relation to FIG. 4. SE 116 may perform these operations in response to secure processor 360 executing software instructions contained in a computer-readable medium, such as secure memory 370. Alternatively, hardwired circuitry may be used in place of or in combination with software instructions to implement processes consistent with the principles of the embodiment. Thus, exemplary implementations are not limited to any specific combination of hardware circuitry and software.

The configuration of components of SE 116 illustrated in FIG. 3B is for illustrative purposes only. It should be understood that other configurations may be implemented. Therefore, SE 116 may include additional, fewer and/or different components than those depicted in FIG. 3B.

Figure 4:
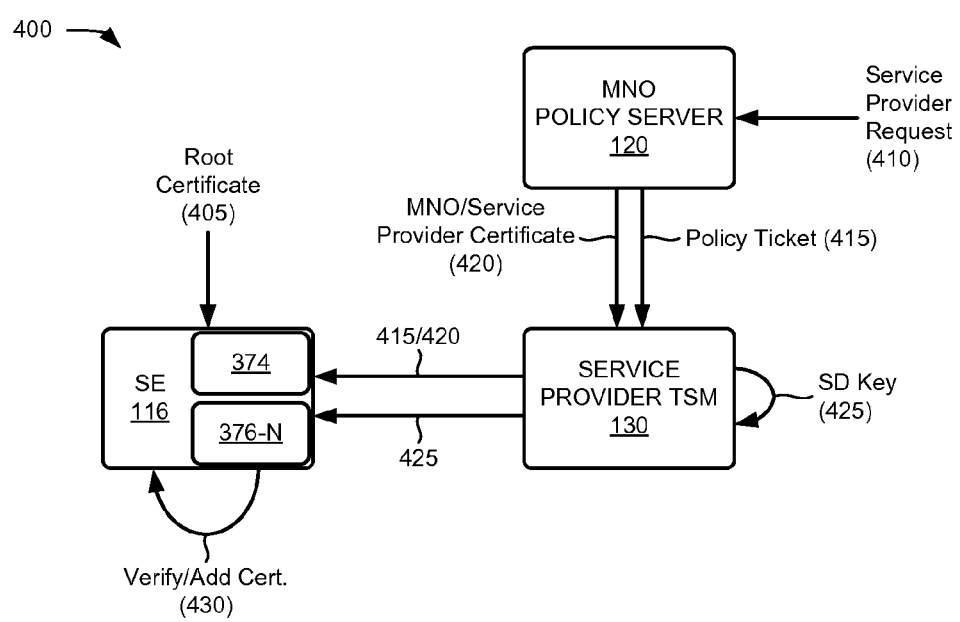
FIG. 4 is a diagram of exemplary communications among devices in a portion of the network environment of FIG. 1.

FIG. 4 is a diagram of exemplary communications among devices in a portion 400 of network environment 100. Communications in FIG. 4 may represent communications for establishing remote secure element policy management without a dedicated OTA session from a secure element owner. As shown in FIG. 4, network portion 400 may include SE 116, MNO policy server 120, and service provider TSM 130. SE 116, MNO policy server 120, and service provider TSM 130 may include features described above in connection with FIGS. 1-3.

As shown in FIG. 4, a card owner, such as a mobile network operator, may inject an owner's (e.g., the certificate authority) root certificate 405 into the CASD portion (e.g., CASD 374) of SE 116 during a manufacture process of the SE 116 card. The manufacturing process may be performed, for example, by an original equipment manufacturer (OEM)

or an MNO. In one implementation, root certificate 405 may comply with public key infrastructure (PKI) standards, such as International Telecommunication Union (ITU) Telecommunication Standardization Sector X.509 (referred to herein as "X.509v3"). Root certificate 405 may include a digital signature from the owner.

Assume that a service provider wants to create a new security domain in SE 116. The service provider may submit a request 410 to be granted access to SE 116. Request 410 may include, for example, a service provider's certificate and a purpose (or a list of privileges needed) for the service provider to access SE 116. In one implementation, request 410 may be provided directly to MNO policy server 120 from a service provider device, such as service provider TSM 130 or another device (not shown). In another implementation, request 410 may be processed through another device or system associated with the MNO before being provided to MNO policy server 120.

In response to receiving request 410, MNO policy server 120 may authenticate the service provider making request 410 and generate a policy ticket 415. Policy ticket 415 may include, for example, a list of privileges for which the service provider is authorized within an SE. Policy ticket 415 may contain the actual policies that SE 116 would enforce when the service provider attempts to create a security domain. Privileges may be limited to actions required to support functions of the service provider, such as create a SD, add a key (e.g., a secure channel protocol (SCP) key) to the SD, change parameters, etc. Policy ticket 415 may cause SE 116 to prevent a service provider from performing actions that are not expressly included in the policy ticket, such as accessing a SD associated with another service provider. MNO policy server 120 may obtain a digital signature for policy ticket 415 and provide the signed policy ticket 415 to service provider TSM 130.

Assuming that the service provider making request 410 is authenticated, MNO policy server 120 may obtain a digital signature for the service provider's certificate (e.g., provided via request 410) and may provide the signed MNO/service provider certificate 420 to service provider TSM 130. In one implementation, MNO policy server 120 may sign policy ticket 415 together with the service provider certificate through X.509v3 extensions, where policy ticket 415 is embedded in certificate 420.

Service provider TSM 130 may receive signed policy ticket 415 and MNO/service provider certificate 420 from MNO policy server 120. In response, service provider TSM 130 may create a SD key 425 for the security domain. This is the key that will belong to an SD that service provider TSM 130 will create for SE 116. In one implementation, SD key 425 may conform to Global Platform Secure Channel Protocol 2 (GP SCP02).

Service provider TSM 130 may then open an OTA session with SE 116 and, as shown in FIG. 4, may provide signed policy ticket 415 and MNO/service provider certificate 420 to SE 116 (e.g., more particularly, CASD 374). As indicated by reference 430, SE 116/CASD 374 may verify both signed policy ticket 415 and MNO/service provider certificate 420 by using root certificate 405 that was injected into SE 116 at the time of the card manufacturing. When signed policy ticket 415 and MNO/service provider certificate 420 are verified, SE 116/CASD 374 may add MNO/service provider certificate 420 to its chain of trust (e.g., as a subordinate certificate authority in a PKI framework). The addition of MNO/service provider certificate 420 to the chain of trust enables service provider TSM 130 delegate privileges, if needed, with other sub-service providers for SE 116.

As further shown in FIG. 4, a new SP SD 376-N is created in SE 116 based on the information of the ticket and personalized with the key 425 from service provider TSM 130. If service provider TSM 130 needs to authenticate CASD 374, CASD 374 can create its own public/private key pair (not shown) and the root certificate 405 can be used to validate.

FIG. 5 includes a simplified diagram of fields in policy ticket 415. As shown in FIG. 5, policy ticket 415 may include a service provider identifier field 510, a SD identifier field 520, a SD description field 530, and a SD policies field 540. Service provider identifier filed 510 may include a unique identifier for the service provider receiving policy ticket 415. SD identifier field 520 may include a unique identifier for the security domain that is authorized by the card owner. SD identifier field may include, for example, an alphanumeric code or a name associated with the application for which the SD is intended. Description field 530 may include a textual description of the security domain purpose and/or policies.

SD policies field 540 may include policies that SE 116 (e.g., CASD 374) will enforce when service provider TSM 130 attempts to create a new security domain. Policies may include, for example, an amount of memory space allocated for the particular SD, access privileges, and/or delegated privileges. Delegated privileges may include, for example, for loading data/files within the new SD, installing an application (or a particular application) on within the new SD, extraditing information from another SD or from within the new SD in SE 116, or deleting data/files from the new SD.

Figure 6:
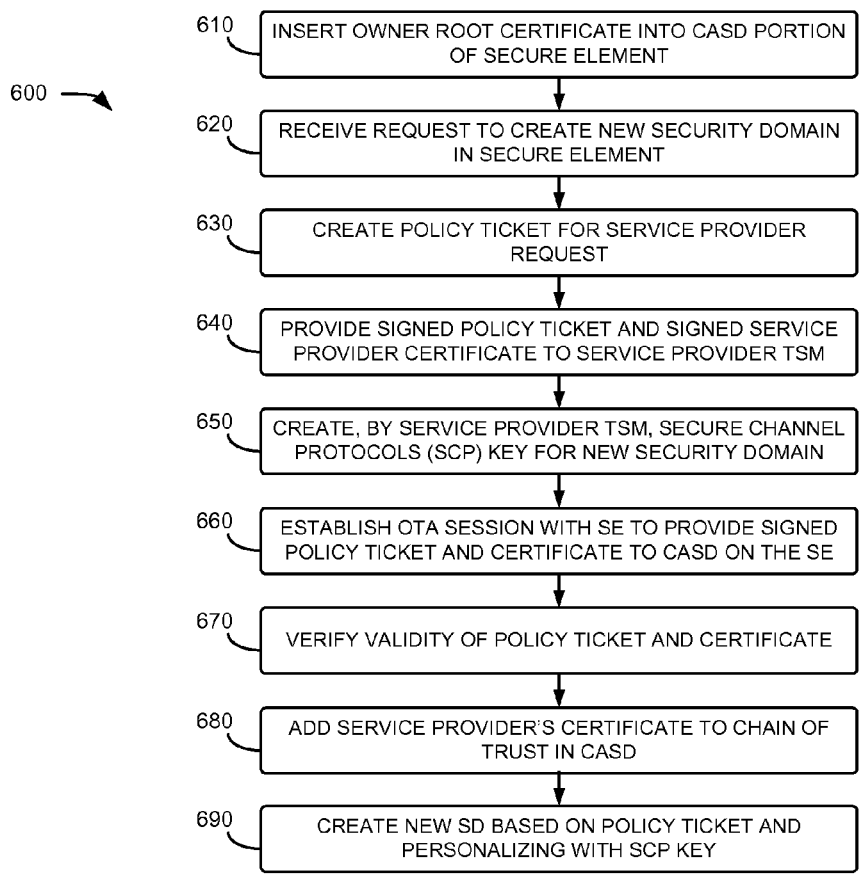
FIG. 6 is a flow diagram illustrating an exemplary process for establishing remote secure element policy management without a dedicated OTA session from a secure element owner, according to an implementation described herein.

FIG. 6 is a flow diagram illustrating an exemplary process 600 for establishing remote secure element policy management without a dedicated OTA session from a secure element owner according to an implementation described herein. In one implementation, process 600 may be performed by service provider TSM 130. In another implementation, some or all of process 600 may be performed by service provider TSM 130 in conjunction with another device or group of devices, such as device 110 and MNO policy server 120.

As shown in FIG. 6, process 600 may include inserting an owner root certificate into a CASD portion of the secure element (block 610). For example, a SIM card owner may, during card manufacturing, inject its MNO Root Certificate into the CASD portion of the SIM card. The root certificate may later be used to enable a service provider to create a new security domain in the card.

Process 600 may further include receiving a request to create a new security domain in the secure element (block 620), and creating a policy ticket for the service provider request (block 630). For example, MNO policy server 120 may create a policy ticket (e.g., policy ticket 415) for a particular service provider. The policy ticket may contain the actual policies that the SIM card would enforce when the service provider attempts create the security domain.

Process 600 may also include providing a signed policy ticket and a signed service provider certificate to the service provider TSM (block 640). For example, MNO policy server 120 may provide the signed MNO/service provider certificate 420 to service provider TSM 130. In one implementation, MNO policy server 120 may sign policy ticket 415 together with the service provider certificate through X.509v3 extensions, where policy ticket 415 is embedded in certificate 420.

Process 600 may additionally include creating, by the service provider, a secure channel protocols (SCP) key for the new security domain (block 650). For example, service provider TSM 130 may create a SD key 425 for the security domain. This is the key that will belong to an SD that service provider TSM 130 will create for SE 116. In one implementation, SD key 425 may conform to Global Platform Secure Channel Protocol 2 (GP SCP02).

Process 600 may further include establishing an OTA session with a device SE to provide the signed policy ticket and the signed service provider certificate to a CASD on the SE (block 660). For example, the service provider TSM may open an OTA session with SE 114 and provide to the CASD (on the SIM card), its service provider certificate (420) and policy ticket (415).

Process 600 may also include verifying the validity of the policy ticket and service provider certificate (block 670). For example, SE 114 verifies the validity of both service provider certificate (420) and policy ticket (415) by using the root chain that was injected at manufacturing.

Process 600 may additionally include adding the service provider's certificate into a chain of trust (block 680). For example, SE 114 may add service provider certificate (420) into the CASD 374 authentication chain. This addition enables the service provider to repeat the same process if needed with other sub-service providers.

Process 600 may additionally include creating the security domain based on the information in the policy ticket and personalizing the security domain with the SCP key (block 690). For example, SP SD 376 may be created based on the information of policy ticket (415) and personalized with SD key (425) of the service provider.

According to implementations described herein, a policy server that is associated with a secure element owner may receive a request, from a service provider, to provision access by an application to the secure element. The policy server may create, in response to the request, a policy ticket, for the service provider, that defines privileges for the service provider to create a security domain or a new profile container within the secure element. The policy server may provide, to a service provider trusted service manager (TSM), the policy ticket and a signed certificate, the signed certificate corresponding to a root certificate that is inserted into a Controlling Authority Security Domain (CASD) portion of the secure element prior to receiving the request. When the CASD receives the policy ticket and signed certificate from the service provider TSM, the CASD may validate them based on the root certificate and provision access to the secure element based on information in the policy ticket.

In the preceding specification, various preferred embodiments have been described with reference to the accompanying drawings. Various modifications and changes may be made thereto, and additional embodiments may be implemented, without departing from the broader scope of the invention as set forth in the claims that follow. The specification and drawings are accordingly to be regarded in an illustrative rather than restrictive sense. For example, while series of blocks have been described with respect to FIG. 6, the order of the blocks may be modified in other implementations. Further, non-dependent blocks may be performed in parallel.

Different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware can be designed to implement these aspects based on the description herein.

Further, certain portions of the invention may be implemented as a "component" or "system" that performs one or more functions. These components/systems may include hardware, such as a processor, an ASIC, or a FPGA, or a combination of hardware and software.

No element, act, or instruction used in the present application should be construed as critical or essential to the invention unless explicitly described as such. Also, as used herein, the article "a" and "one of" is intended to include one or more items. Further, the phrase "based on" is intended to mean "based, at least in part, on" unless explicitly stated otherwise.

What is claimed is:

1. A method, comprising:
    receiving, by a policy server device that is associated with a secure element owner, a request from a service provider for a client application to provision access, by the client application, to a secure element residing on a communication device, wherein the service provider is different than the secure element owner and the communication device;
    creating, by the policy server device and in response to the request from the service provider, a policy ticket, wherein the policy ticket defines privileges, to be enforced by the secure element, for the service provider to create a security domain or a new profile within the secure element;
    providing, by the policy server device and to a service provider trusted service manager (TSM) device, the policy ticket and a signed certificate, wherein the signed certificate corresponds to a root certificate that is inserted, prior to receiving the request from the service provider, into a Controlling Authority Security Domain (CASD) portion of the secure element;
    receiving, by the CASD portion and from the service provider TSM device, the policy ticket and the signed certificate;
    verifying, by the CASD portion, the policy ticket and the signed certificate based on the root certificate;
    provisioning, based on information in the policy ticket, access by the application to the secure element, wherein the provisioning includes creating, on the secure element, a new security domain;
    creating, by the service provider TSM device, a secure channel protocol (SCP) key for the new security domain;
    personalizing the new security domain with the SCP key;
    receiving, by the CASD portion and from the service provider TSM device, the SCP key;
    receiving, by the CASD portion and from another service provider TSM device, another policy ticket and another signed certificate for the new security domain;
    verifying, by the CASD portion, the other policy ticket and the other signed certificate based on the SCP key; and
    modifying, on the secure element, the new security domain based on information in the other policy ticket.

2. The method of claim 1, further comprising:
    inserting, onto a memory card and as part of an original equipment manufacturer (OEM) process, the root certificate into the CASD portion of the secure element.

3. The method of claim 1, further comprising:
    adding the signed certificate to a chain of trust in the CASD portion.

4. The method of claim 1, wherein the privileges defined in the policy ticket identify an amount of memory space allocated for the new security domain, and the method further comprising:

establishing, by the service provider TSM device and with the secure element, an over-the-air session to provide the policy ticket and the signed certificate to the CASD portion on the secure element.

5. The method of claim 1, wherein provisioning access, by the application, to the secure element includes:

creating, on the secure element, a new profile container.

6. The method of claim 1, wherein providing the policy ticket and a signed certificate further comprises:

embedding the policy ticket in the signed certificate.

7. The method of claim 1, wherein the secure element comprises a Universal Integrated Circuit Card (UICC) card.

8. The method of claim 1, wherein the secure element comprises a removable card.

9. The method of claim 2, further comprising:

adding, after verifying the policy ticket and the signed certificate, the signed certificate to a chain of trust in the CASD portion.

10. The method of claim 1, wherein the policy ticket includes:

a unique identifier for the service provider receiving the policy ticket, and a security domain identifier associated with the client application for which the security domain is intended.

11. A system, comprising:

a policy server device associated with a secure element owner, the policy server device including:

a communication interface connected to an external network, a memory configured to store instructions, and a processor configured to execute the instructions stored in the memory to:

receive a request from a service provider device for a client application to provision access, by the client application, to a secure element residing on a communication device, wherein the service provider device is different than the secure element owner and the communication device, create, in response to the request from the service provider device, a policy ticket, wherein the policy ticket defines privileges, to be enforced by the secure element, for a service provider to create a security domain or a new profile within the secure element, and provide, to a service provider trusted service manager (TSM) device, the policy ticket and a signed certificate, wherein the signed certificate corresponds to a root certificate inserted into a Controlling Authority Security Domain (CASD) portion of the secure element prior to receiving the request from the service provider device;

a device including:

a secure element with the root certificate in the CASD portion of the secure element, and a processor within the secure element to:

receive, from the service provider TSM device, the policy ticket and the signed certificate, verify the policy ticket and the signed certificate based on the root certificate, and provision, based on information in the policy ticket, access by the application to the secure element, wherein the provisioning includes creating, on the secure element, a new security domain; and the service provider TSM device including another processor to:

create a secure channel protocol (SCP) key for the new security domain, and personalize the new security domain with the SCP key, wherein the processor within the secure element is further to:

receive, from the service provider TSM device, the SCP key, receive, from another service provider TSM device, another policy ticket and another signed certificate for the new security domain, verify the other policy ticket and the other signed certificate based on the SCP key, and modify, on the secure element, the new security domain based on information in the other policy ticket.

12. The system of claim 11, wherein the root certificate is inserted into the CASD portion of the secure element as part of a manufacturing process.

13. The system of claim 11, wherein the processor in the policy server device is further configured to execute the instructions stored in the memory to:

add the signed certificate to a chain of trust in the CASD portion.

14. The system of claim 11, further comprising:

the service provider TSM device to:

establish, with the secure element on the device, an over-the-air session to provide the policy ticket and the signed certificate to the CASD portion.

15. The system of claim 11, wherein the secure element comprises a removable card.

16. The system of claim 11, wherein the other policy ticket includes:

a unique identifier for the service provider receiving the other policy ticket, and a security domain identifier associated with another client application for which the new security domain is intended.

17. The system of claim 11, wherein, provisioning access by the application to the secure element, the processor in the policy server device is further configured to execute the instructions stored in the memory to:

create, on the secure element, a new profile container.

* * * * *